(12) United States Patent
Huff

(10) Patent No.: US 8,893,988 B2
(45) Date of Patent: Nov. 25, 2014

(54) LIQUID-DISPENSING STATION

(76) Inventor: Kevin W. Huff, Austin, TX (US)

(*) Notice: Subject to any disclaimer, the term of this patent is extended or adjusted under 35 U.S.C. 154(b) by 533 days.

(21) Appl. No.: 13/354,391

(22) Filed: Jan. 20, 2012

(65) Prior Publication Data

US 2012/0111889 A1  May 10, 2012

Related U.S. Application Data

(63) Continuation-in-part of application No. 12/434,025, filed on May 1, 2009, now abandoned.

(51) Int. Cl.
   *B05B 1/14* (2006.01)
   *A01G 25/09* (2006.01)

(52) U.S. Cl.
   CPC ................................. *A01G 25/09* (2013.01)
   USPC ......................................... 239/555; 239/558

(58) Field of Classification Search
   CPC .................................. B05B 7/06; B05B 7/08
   USPC ........................ 239/548, 554, 555, 558, 289
   See application file for complete search history.

(56) References Cited

U.S. PATENT DOCUMENTS

| | | | | |
|---|---|---|---|---|
| 4,732,326 A | * | 3/1988 | Bessling et al. | 239/338 |
| 4,786,297 A | * | 11/1988 | Gethke et al. | 96/361 |
| 4,874,133 A | * | 10/1989 | Gethke et al. | 239/555 |
| 4,911,340 A | * | 3/1990 | Abom | 222/636 |
| 6,016,969 A | * | 1/2000 | Tilton et al. | 239/1 |

* cited by examiner

*Primary Examiner* — Davis Hwu
(74) *Attorney, Agent, or Firm* — David O. Simmons

(57) ABSTRACT

A liquid-dispensing station comprises a liquid-holding tank and a plurality of liquid-dispensing structures. The liquid-holding tank and the plurality of liquid-dispensing structures are adjoined to form a liquid-dispensing apparatus. Liquid from within the liquid-holding tank can be dispensed through one or more of the liquid-dispensing structures, which are in fluid communication with a liquid-receiving space of the liquid-holding tank. When the liquid-holding tank is empty, the liquid-dispensing apparatus is stackable within another identically configured liquid-dispensing apparatus. Advantageously, the liquid-holding tank and the liquid-dispensing structures are jointly configured such that the liquid-dispensing structures of one liquid-dispensing apparatus do not contact the liquid-holding tank of another liquid-dispensing apparatus when stacked therein. In this regard, a plurality of the liquid-dispensing apparatuses are stackable with each other without interference from the liquid-dispensing structures.

20 Claims, 8 Drawing Sheets

ID-DISPENSING STATION

CROSS REFERENCE TO RELATED APPLICATIONS

This continuation-in-part patent application claims priority to co-pending U.S. Non-Provisional patent application having Ser. No. 12/434,025 filed May 1, 2009 entitled "Liquid-Dispensing Station", having a common applicant herewith and being incorporated herein in its entirety by reference.

FIELD

This disclosure relates generally to liquid delivery systems, and more particularly to stations for dispensing liquids.

BACKGROUND

Various methods and devices for delivering potable water to remote locations have been used in various situations and to satisfy particular types of needs. The US military, for example, uses what are sometimes referred to as water buffaloes to provide potable water to troops in the field. These water buffaloes are large tanks towed on a trailer, and are designed to provide water to a large number of troops. At the other extreme are canteens and similar containers used to provide water for individuals while hiking, or while otherwise away from any easily accessible source of potable water. Other methods known for dispensing liquids to individuals or larger groups, providing personal sized bottles or cans of water or other liquids, or using water coolers to provide water to workers in office situations.

Known methods of providing liquids are, however, less-than-perfect. For example, canteens designed to hold a small amount of liquid but can be carried by a single person. Trailer-towed water tanks can present logistical problems, and may involve excessively high equipment costs. Providing each member of a large group within individual bottle of water can also be cost prohibitive, and can result in large qualities of waste, which may be undesirable, especially given current environmental concerns. Water coolers such as those found in offices, can be particularly unsuited for use in locations where no electricity is available, and are also likely to be cost prohibitive.

SUMMARY

A portable, liquid-dispensing station includes a portable stand capable of being carried by a single laborer, and a portable tank also capable of being carried, by a single laborer when empty. The portable stand has a frame with a lower portion configured to be placed on a supporting surface, and an upper portion configured to receive the portable tank and support the portable tank when filled with a liquid, for example water. The portable tank is configured to be received and seated upon the upper portion of the frame. The tank has an opening in the top to receive a liquid to be dispensed, and one or more openings formed in the lower part of the tank.

Multiple liquid-dispensing valves can be spaced around the perimeter of the tank to allow the liquid in the tank to be dispensed when activated by a user. These dispensing valves can be each be attached to the portable tank through different openings formed in the portable tank, or the valves can be attached to a conduit having an inlet connected to the tank, and configured to be placed at least partially about the perimeter of the portable tank.

The stand can be configured to support the tank so that at least one of the valves is positioned between about waist level and shoulder level of an average-height American adult when the tank is supported by the portable stand. In some embodiments the stand is between about 32 inches high and 54 inches high. In some embodiments, the stand is stackable with other stands.

The liquid-dispensing station can also include a collapsible canopy fastened to the portable stand, which can have multiple struts capable of being fastened to the stand. The canopy can also include a frame that has support members extending on all sides beyond the outer edges of the portable tank and the portable stand, and has a flexible fabric attached to the canopy frame. In some embodiments, the canopy is adjustable to provide shade to the tank and to a user operating the valves.

In some embodiments, the station includes a misting system configured to draw liquid from the tank and push the liquid through multiple misting nozzles. The misting system can include a battery operated pump that draws liquid from an auxiliary opening in the tank, and a circuit of misting nozzles.

Various embodiments can be realized as a method including transporting, in a single vehicle, a liquid to be dispensed, a cooling material, a dispensing container, and a container stand to a setup location. Both the dispensing container and the container stand are constructed to be sufficiently lightweight to be carried by a single laborer, the dispensing container includes a plurality of dispensing valves spaced about at least part of its lower portion, and a first opening formed in an upper portion of the dispensing container. One or more workers unload the container stand and the dispensing container, unload at least a portion of the cooling material from the transport vehicle, and put some of the cooling material, e.g. ice, in the dispensing container. The dispensing container can be at least partially filled with liquid from the vehicle.

In one preferred embodiment of the present invention, a stackable liquid-dispensing apparatus is configured for enabling an identically-configured stackable liquid-dispensing apparatus to be positioned therein in a stacked manner and for enabling the stackable liquid-dispensing apparatus to be positioned within the identically-configured stackable liquid-dispensing apparatus in a stacked manner (i.e., stackable within each other). The stackable liquid-dispensing apparatus comprises a liquid-holding tank and a liquid-dispensing structure. The liquid-holding tank has an open end portion, a closed end portion and a liquid-receiving space defined therebetween. The liquid-holding tank includes a liquid-dispensing structure recess adjacent to the closed end portion thereof. A landing within the liquid-receiving space defines a top wall of the liquid-dispensing structure recess. The liquid-holding tank rests upon the landing of the identically-configured stackable liquid-dispensing apparatus when the stackable liquid-dispensing apparatus is positioned in the stacked manner within the liquid-receiving space of the identically-configured stackable liquid-dispensing apparatus. The liquid-dispensing structure is mounted on the liquid-holding tank and is in fluid communication with the liquid-receiving space thereof. The liquid-dispensing structure is positioned entirely within the liquid-dispensing structure recess such that the liquid-dispensing structure does not contact the identically-configured stackable liquid-dispensing apparatus when the stackable liquid-dispensing apparatus is positioned in the stacked manner within the liquid-receiving space of the identically-configured stackable liquid-dispensing apparatus.

In another preferred embodiment of the present invention, a liquid-dispensing station comprises a liquid-holding tank, a plurality of liquid-dispensing structures, and a support stand. The liquid-holding tank has a side wall and a bottom wall connected to the side wall at a first end portion of the side wall such that the side wall and the bottom wall jointly define a liquid-receiving space therein. The liquid-holding tank includes a plurality of liquid-dispensing structure recesses therein adjacent the bottom wall thereof. The top wall of each one of the liquid-dispensing structure recesses forms a landing within the liquid-receiving space of the liquid-holding tank. The liquid-dispensing structures are each mounted on the liquid-holding tank within a respective one of the liquid-dispensing structure recesses. Each one of the liquid-dispensing structures is in fluid communication with the liquid-receiving space. Each one of the liquid-dispensing structures is contained entirely within a space jointly defined between perimeter edges of the respective one of the liquid-dispensing structure recesses. The support stand has a lower portion configured to be engaged with a station supporting surface and an upper portion including a tank-supporting surface having the liquid-holding tank supported thereon. The bottom wall of the liquid-holding tank defines a bottom surface thereof. A stand positioning structure is integral with the bottom wall of the liquid-holding tank. The upper portion of the support stand has a tank positioning structure integral therewith. The bottom surface of the liquid-holding tank is seated on the tank-supporting surface of the support stand when the liquid-holding tank is supported on the support stand. The stand positioning structure and the tank positioning structure are engaged with each other for limiting unrestricted translation of the bottom surface of the liquid-holding tank along the tank-supporting surface of the support stand when the bottom surface of the liquid-holding tank is seated on the tank-supporting surface of the support stand.

In another preferred embodiment of the present invention, a liquid-dispensing station system comprises a plurality of liquid-holding tank apparatuses each including a liquid-holding tank and a plurality of liquid-dispensing structures. Each one of the liquid-dispensing structures is mounted on the liquid-holding tank and is in fluid communication with a liquid-receiving space thereof. The liquid-holding tank of each one of the liquid-holding tank apparatuses has a side wall and a bottom wall connected to the side wall at a first end portion of the side wall such that the side wall and the bottom wall jointly define the liquid-receiving space therein. Each liquid-holding tank includes a plurality of liquid-dispensing structure recesses that are formed in the side wall thereof adjacent the bottom wall thereof. A top wall of each one of the liquid-dispensing structure recesses forms a landing within the liquid-receiving space of a respective one of the liquid-holding tanks. The side wall and bottom wall of a respective one of the liquid-holding tanks are jointly configured for enabling a first one of the liquid-holding tank apparatuses to be stacked within the liquid-receiving space of a second one of the liquid-holding tank apparatuses such that the bottom wall of the first one of the liquid-holding tank apparatuses is engaged with and supported by the landing of at least one of the liquid-dispensing structure recesses of the second one of the liquid-holding tank apparatuses when the first one of the liquid-holding tank apparatuses is stacked within the liquid-receiving space of the second one of the liquid-holding tank apparatuses. Each one of the liquid-dispensing structures is positioned entirely within a respective one of the liquid-dispensing structure recesses such that no portion thereof contacts the side wall or the bottom wall of the second one of the liquid-holding tank apparatuses when the first one of the liquid-holding tank apparatuses is stacked within the liquid-receiving space of the second one of the liquid-holding tank apparatuses.

After use, the dispensing system (e.g., a liquid-dispensing station and/or liquid-dispensing apparatus in accordance with the present invention) can be disassembled by removing the dispensing container from the container stand, and storing the dispensing container and the container stand on the single vehicle. Additionally, in some embodiments rubbish generated in conjunction with using the dispensing system is also collected and placed on the vehicle, and the container, stand, and rubbish are transported away.

DETAILED DESCRIPTION

Various dispensing stations disclosed herein can be used to deliver potable water or other liquids to groups of people at remote locations, or at locations where access to drinking water may otherwise be limited. A dispensing station can include a stand, a tank, multiple dispensing valves, a filter, a misting system, and a canopy to provide shade to individuals using the liquid-dispensing system and to assist in keeping a liquid contained in the tank at a desired temperature.

Figure 1:
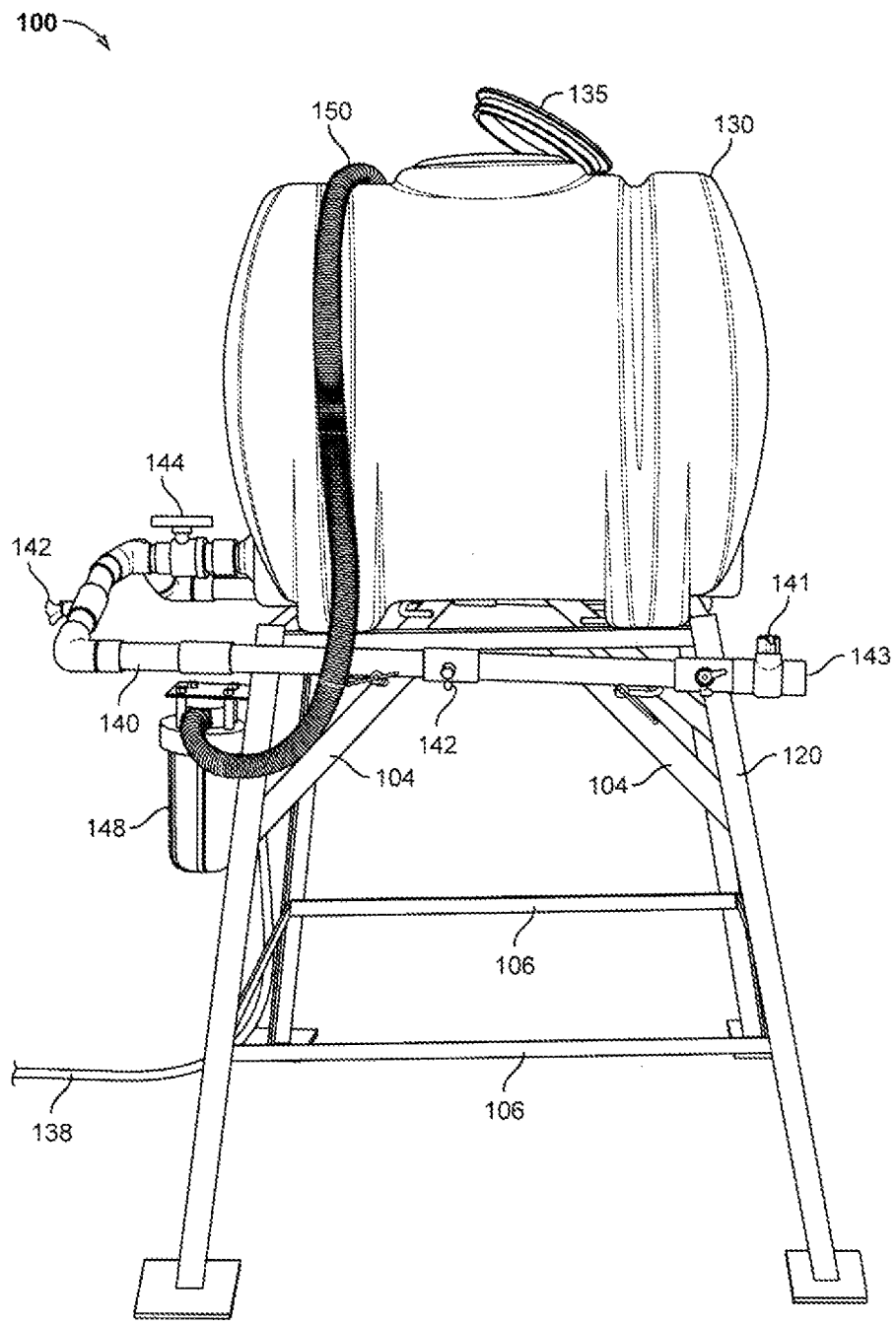
FIG. 1 is a side view of a liquid-dispensing system including a tank and stand according to embodiments of the present disclosure.

Referring first to FIG. 1, a portable, liquid-dispensing station will be discussed according to various embodiments of the present disclosure. Station 100 can include a stand 120 configured as a metal frame having various angle braces 104 and cross braces 106; a tank 130 capable of holding a liquid to be dispensed, multiple liquid-dispensing valves 142 for dispensing liquid from tank 130. Valves 142 are in fluid communication with tank 130 via shutoff valve 144, which is in turn connected to an opening formed in the side of tank 130. Station 100 also includes a filter 148 connected to hose 150, which can be placed in the top opening of tank 130 for filling tank 130. Fill tube 138 can be used to provide liquid to filter 148.

In operation, fill tube 138 may be connected to a larger tank carried on a vehicle or trailer, a fire hydrant, or to another desired source of liquid. Liquid can be pumped through fill tube 138, through filter 148 and hose 150, then into tank 130. In some embodiments, no filter is included on station 100. Additionally, some embodiments employ a filter at the liquid source. Other embodiments include a screen or filter within tank 130. In at least one embodiment, the liquid used to fill tank 130 is drinking water, but other types of liquid can be used as desired.

After filling tank 132 to a desired level, hose 150 can be removed, or simply draped over the side of tank 130 for later use, and the opening at the top of tank 130 can be closed with lid 135. In at least one embodiment, hose 150 can be connected to tank 130 using a quick-disconnect fitting, or another type of valve affixed to tank 130, or included in lid 135. In some embodiments lid 135 can be a locking lid, or can be formed to require a special tool to be opened or closed, thereby making tampering with the contents of tank 130 more difficult.

After tank 130 is filled to the desired level, and lid 135 has been secured, shutoff valve 144 can be opened to allow the liquid in tank 130 to flow from tank 130 into pipe 140, thereby making the liquid available to be dispensed by liquid-dispensing valves 142. In some embodiments, pipe 140 runs along at least two sides of tank 130, so that a user can access any of multiple liquid-dispensing valves 142 from any side of tank 130. Furthermore, providing pipe 140 on multiple sides of tank 130, with multiple liquid-dispensing valves 142 spaced along pipe 140, can make it easier for more than one person to dispense liquid from tank 130 at the same time another person is doing the same.

In some embodiments, pipe 140 is angled downward, so that an endpoint 143 of tube 140 is closer to the ground than the inlet of pipe 140. In this way, a drain valve 141 can be used to drain the contents of tank 131 after it is no longer desired to dispense liquid from tank 130, or for cleaning purposes. Furthermore, having pipe 140 positioned at a downward angle provides a gravity feed for liquid from tank 130.

Pipe 140 can be formed of a suitable liquid impermeable material that allows connection of liquid-dispensing valves 142. In some embodiments ply vinyl chloride (PVC) pipe is used to form pipe 140. In such an embodiment, various commercially available liquid-dispensing valves 142, shutoff valve 144, and drain valve 141 can be attached to the pipe 140 using PVC glue and commonly known methods of connecting PVC pipes, joints, elbows, and other pieces. In some embodiments, other materials, such as various types of metal, plastic, or rubber tubing, can be used consistent with usability, strength, weight, or other similar design criteria. In some embodiments, pipe 140 can be formed of a material that is not entirely impermeable to liquids.

Stand 120 can be made of angle iron, aluminum pipe, or another suitable material having sufficient strength to support the weight of tank 130 when tank 130 is filled with a liquid to be dispensed. In some embodiments, stand 120 is tapered or otherwise formed to provide easy stackability with other stands or parts of station 100. Note that although stand 120 is illustrated as a frame, stand 120 may be constructed formed into a shell (not illustrated). In some embodiments, stand 120 can also include shelves or other storage capabilities. In some embodiments stand 120 may require some assembly.

Other types of construction can also be used for stand 120 as desired, but regardless of the type of construction, it is preferred for stand 120 to be sufficiently lightweight to allow a single laborer to pick up, move, and put the stand in place without assistance. Furthermore, it is advantageous for the height of stand 120 be between about 32 inches high and 54 inches high, thereby placing liquid-dispensing valves 142 somewhere between about waist and shoulder level of an average adult. By configuring system 100 so that liquid-dispensing valves 142 are between about waist and shoulder high, various embodiments allow easy access to liquid-dispensing valves 142 by a variety of different individuals. In some embodiments, the stand is constructed to conform to various regulatory requirements relating access by disabled individuals.

Tank 130 can be constructed of any of various commercially available materials suitable for holding potable liquids, including various plastics, lightweight metals, or the like. In a preferred embodiment, tank 130 is made of a suitably lightweight material, and shaped so that a single laborer can offload tank 130 from a transport vehicle and placed tank 130 on top of stand 120 without assistance. In some embodiments, tank 130 can be easily stackable with other tanks 130 or with a stand 120 to conserve storage space.

Station 100 can include various mechanisms (not illustrated) to secure tank 130 to stand 120. These locks, fasteners, stakes, cables, or similar devices can be used to discourage tampering or movement of station 100 by unauthorized personnel once assembled. Although not illustrated, linings can be used in tank 130 as desired, including disposable linings.

Figure 2:
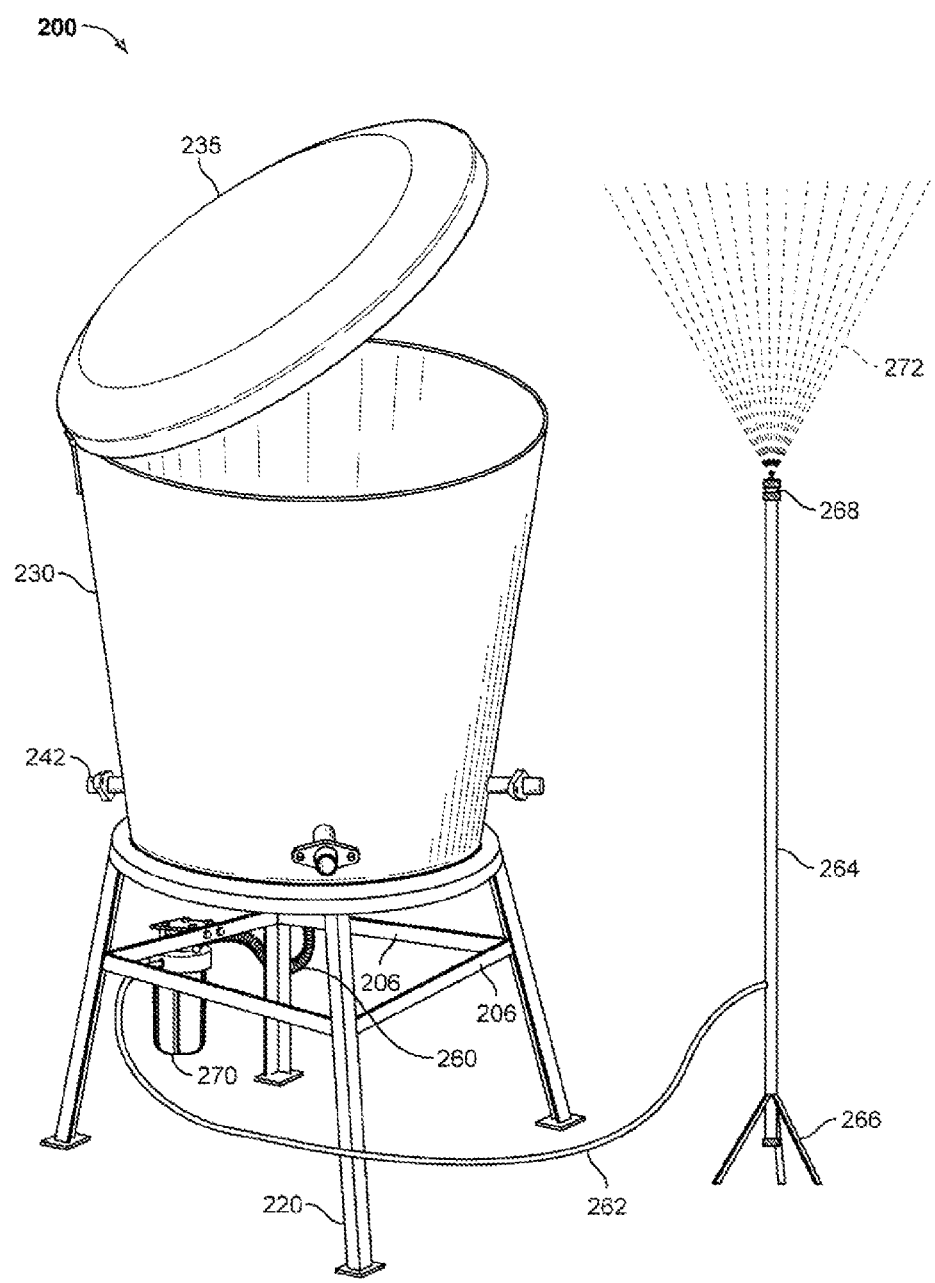
FIG. 2 is a perspective view of a liquid-dispensing system including a mister according to embodiments of the present disclosure.

Referring next to FIG. 2, other embodiments of a portable liquid-dispensing station will be discussed. Station 200 includes tank 230 having cover 235 to cover an opening formed in the top portion of tank 230. The bottom portion of tank 230 can include multiple openings spaced around an outer perimeter of tank 230, each of which can have a liquid-dispensing valve 242 attached thereto. Liquid-dispensing valves 242 can be manually operated, push-button valves, conventional spigots like those used to connect garden hoses to a home water line, electronically activated valves, or any other type of valve suitable for dispensing liquids. Station 200 also includes stand 220, having cross members 206 for strength. Stand 220 provides support for tank 230, and can be configured to maintain tank 230 at a desired distance from the ground.

An opening (not illustrated) in the bottom of tank 230 is in fluid communication with pump 270 through pump hose 260. Pump 270 can use pump hose 260 to pump liquid from tank 230, and through misting hose 262. In some embodiments, pump 270 is a battery operated pump which is temporarily connected to stand 220. In other embodiments, pump 270 may be connected directly to a bottom portion of tank 230. In some embodiments, pump 270 can be configured to draw liquid from one of the liquid-dispensing valves 242.

Misting hose 262 can be connected to mister 264, which includes a stand 266, and misting nozzle 268, which converts the liquid into a mist 272 of fine droplets. One or more misters 264 can be used to provide evaporative cooling over a variety of areas nearby tank 230.

In a preferred embodiment, tank 230 can be partially filled with ice, with the remainder of tank 230 being filled with potable water. Pump 270 can draw water from tank 230 and pump it to one or more misters 264 to provide evaporative cooling in the area of station 200. The use of one or more misters 264 can help users dispensing water from station 200 to be more comfortable. Furthermore, evaporative cooling provided by one or more ministers 264 can help to regulate the temperature of the water in tank 230. In some embodiments, pump 270 can draw water from a separate reservoir (not illustrated) rather than from tank 230.

Station 200 is, in at least one embodiment, configured to permit a single laborer to offload each of its various components, and assemble station 200 without help from other individuals. To aid in transporting the various elements of station 200, stand 220 and tank 230 can be stackable, one inside the other. To facilitate stackability, some embodiments employ liquid-dispensing valves 242 that are not permanently affixed to tank 230. In some such embodiments, threaded openings in the bottom portion of tank 230 can be used to receive screw-in liquid-dispensing valves. Other types of openings and connections, including bayonet connectors or quick-disconnect couplings may be employed in some embodiments. Furthermore, pump 270 can be connected to stand 220 or tank 230 using various fasteners, adhesives, or mating-type connections.

Figure 3:
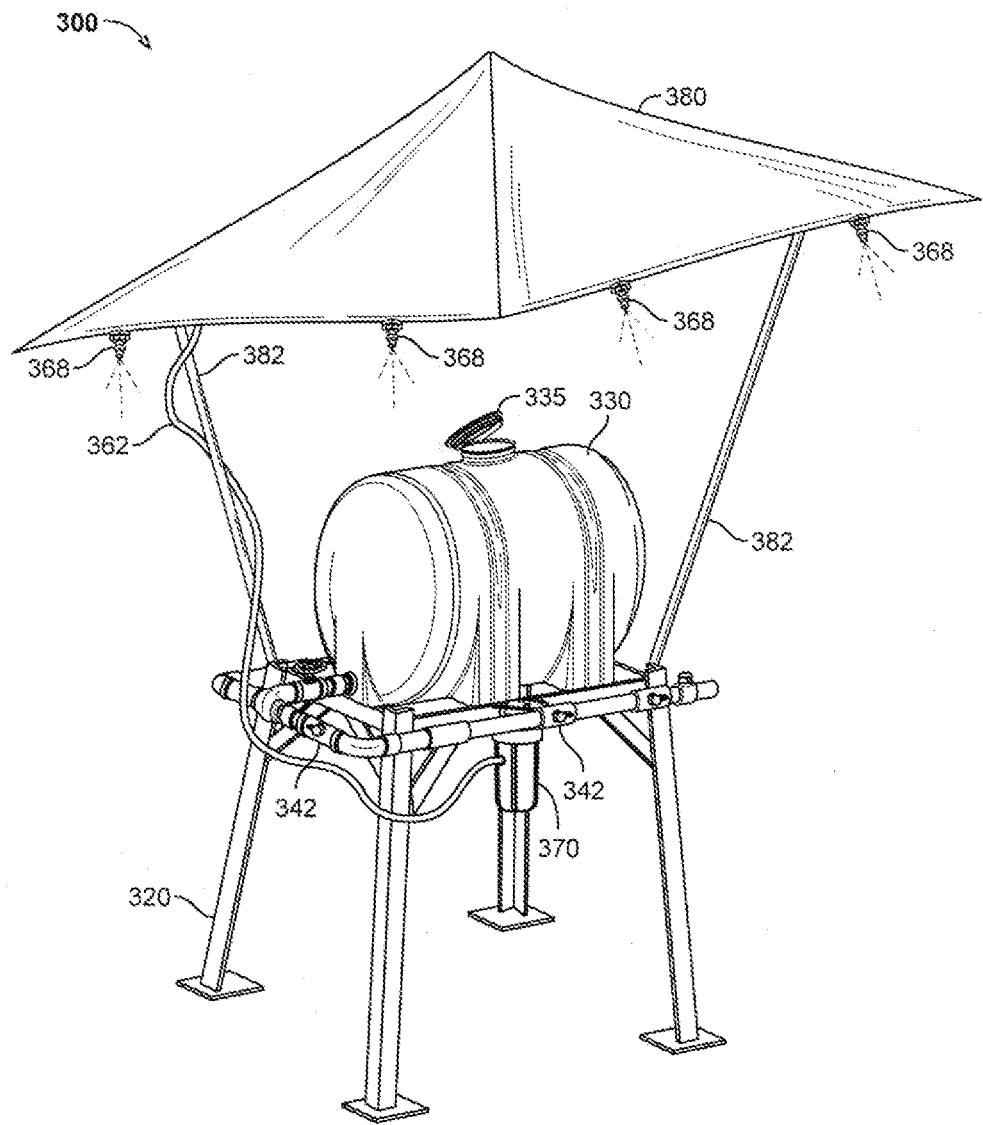
FIG. 3 is a perspective view of the liquid-dispensing system including a tank, stand, canopy, and misters according to embodiments of the present disclosure.

Referring next to FIG. 3, a portable liquid-dispensing station with the canopy is illustrated according to various embodiments of the present disclosure. Station 300 includes a tank 330 having an opening in a top portion, and one or more openings in a bottom portion. The opening in the top portion can be used to fill tank 330 with liquids and ice, while the one or more openings in the bottom portion can be used to connect valves 342 to tank 330. Stand 320 provides support for tank 330 and canopy 380. Canopy 380 includes struts 382, which can be connected to stand 320 and provide support for a frame and fabric portion of canopy 380. Attached to canopy 380 are misting nozzles 368, which are in turn connected to misting tube 362. Pump 370 can be connected to an opening (not shown) in the bottom portion of tank 330 and is used to pump liquid from tank 330 to misting nozzles 368, thereby providing evaporative cooling to help regulate the temperature around tank 330. The mist provided from misting nozzles 368 can also help make users of station 300 more comfortable than they might otherwise be without the use of misters 368.

Canopy 380 can include a frame portion covered completely or partially by canvas, or another suitable shade producing material. In some embodiments, canopy 380 is adjustable to provide shade over all or a portion of tank 330. In some embodiments, canopy 380 extends past all sides of tank 330, so that individuals using Station 330 to dispense liquids can be shaded, and potentially made more comfortable. In some embodiments, a frame portion of canopy 380 extends beyond tank 330 in all directions. In at least one preferred embodiment, the canopy is approximately 10 feet by 10 feet. In other embodiments, canopy 380 can take the form of a collapsible umbrella attached to a frame member of stand 320.

Each portion of station 300 is preferably configured to be handled by a single laborer, and to permit assembly by a single person. Once assembled, station 300 can be used to provide water or other liquids to people attending gatherings such as backyard barbecues, concerts, political event, races, or other events at which access to other sources of water or liquids may be limited.

Figure 4:
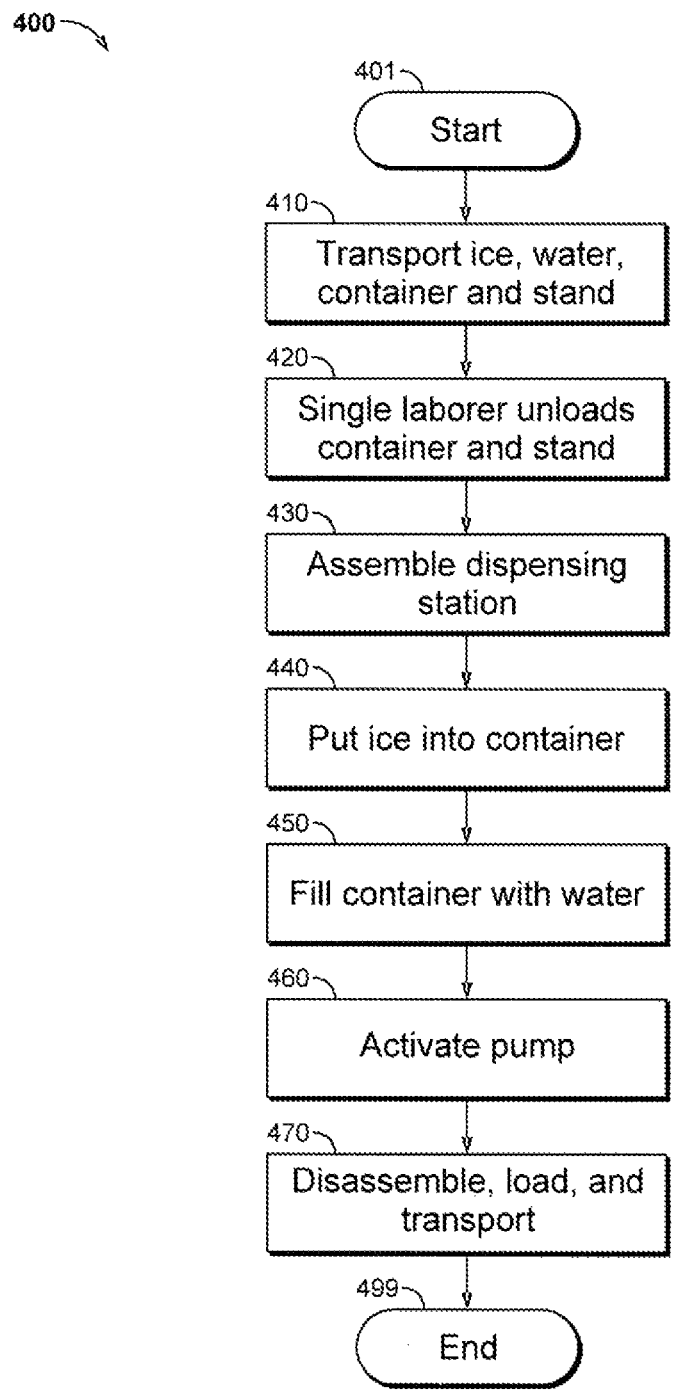
FIG. 4 is a flowchart illustrating a method according to embodiments of the present disclosure.

Referring next to FIG. 4, a method according to various embodiments of the present disclosure will be discussed. Method 400 begins as shown by block 401. As shown by block 410, ice, water, a container, a stand, or other elements of a portable liquid-dispensing station can be transported to a desired location. In some embodiments, a single vehicle or trailer can transport all of these elements. The water or other liquid can be transported in a tank for later transfer to a portable dispensing station, ice can be transported in an insulated storage section, and the stands and containers can be stacked and transported in other areas of the vehicle or trailer.

As illustrated by block 420, a single laborer can unload the container, the stand, and any other portions of the portable liquid-dispensing station to be assembled. The other portions of the portable liquid-dispensing station can include a canopy system, and a misting system. In various embodiments, the container and stand are each configured to be able to be handled by a single laborer, so that a single worker, for example the driver of the vehicle transporting the portable liquid-dispensing station, can assemble the station without assistance. In some embodiments, although a single laborer is capable of unloading and assembling the container and stand, it may be preferable to use multiple laborers, with one worker handling the container, another handling the stand, and a third or fourth being responsible for the canopy and the misting system. Regardless of the number of laborers actually used in assembling the portable liquid-dispensing station, in a preferred embodiment a single laborer could assemble the entire system without mechanical assistance, or the assistance of another worker.

As illustrated by block 430, the portable liquid-dispensing station can be assembled by placing the stand may be placed on the ground, or on some other support structure, and then placing an empty tank on top of the stand. In embodiments in which the liquid-dispensing valves are not permanently affixed to the tank, the valves can be attached directly to the tank by screwing or otherwise attaching the valves directly to the tank, or indirectly by means of a pipe or other liquid conduit.

In embodiments employing a misting system, a misting pump can be connected to the tank to draw water or another liquid from the tank, and to pump that liquid to misting nozzles. In embodiments employing a canopy, the canopy can be attached to the stand, to the tank, or otherwise put in place to provide shade over a desired area. In embodiments employing a combination canopy and misting system, the combination canopy and misting system can be assembled and put into place.

As illustrated by block 440, ice can be carried from the insulated section of the transport vehicle and put into the tank through an opening in the top of the tank. As illustrated by block 450, a pump system, pressure, a gravity fill system, or some combination thereof, can be used to fill the remaining portion of the tank with water or another liquid to be dispensed.

As illustrated by block 460, any locks or locking mechanisms can be engaged, and valves can be properly positioned for dispensing liquids. Additionally, the misting pump can be activated if present, so that the misting system begins to operate. In some embodiments, the misting pump does not operate continuously, but operates to provide evaporative cooling when triggered by a proximity detector, in response to a timer, or in response to another suitable triggering event.

Workers may leave the site after assembling the portable liquid-dispensing station, or remain at the site to assist in operation of the dispensing station. As illustrated by block 470, after the portable liquid-dispensing station is no longer needed, the station can be disassembled, packed back onto the transport, and removed from the location. In some embodiments, the same transport used to deliver the portable liquid-dispensing station to the site is used to collect portable the liquid-dispensing stations that are done being used.

A portion of the vehicle formerly used for transporting ice or other cooling material may be empty, and therefore available for transporting rubbish left at the portable dispensing station by users of the portable liquid-dispensing station. In some such embodiments, protective liners can be placed inside the area used for holding ice or other cooling material, so that the rubbish does not dirty the holding area. Using the same transport area to deliver ice, and to collect rubbish after the portable liquid-dispensing station is done being used, can help provide a cost savings, and an additional valuable service related to the use of the portable liquid-dispensing station. Method 400 ends as illustrated by block 499.

As previously discussed, in some embodiments of the present invention, it is advantageous for liquid-dispensing apparatuses of liquid-dispensing stations to be stackable with each other when such liquid-dispensing apparatuses are not in use. One important preference in this regard is that liquid-dispensing structures (e.g., nozzles, values, couplings, etc) through which liquid in a liquid-holding tank of such apparatuses is dispensed not need to be detached from the liquid-holding tank thereof to allow for such stacking. In this regard, it is preferred for one liquid-dispensing apparatus (i.e., liquid-holding tank with mounted liquid-dispensing structures) to be stackable within another identically configured liquid-dispensing apparatus when the liquid-holding tanks thereof are empty. Furthermore, it is preferred and beneficial for the liquid-holding tanks and the liquid-dispensing structures thereof to be jointly configured such that the liquid-dispensing structures of one liquid-dispensing apparatus do not contact the liquid-holding tank of another liquid-dispensing apparatus when stacked therein. In this regard, a plurality of the liquid-dispensing apparatuses configured in accordance with one embodiment are preferably stackable with each other without interference from the liquid-dispensing structures thereof.

Figure 5:
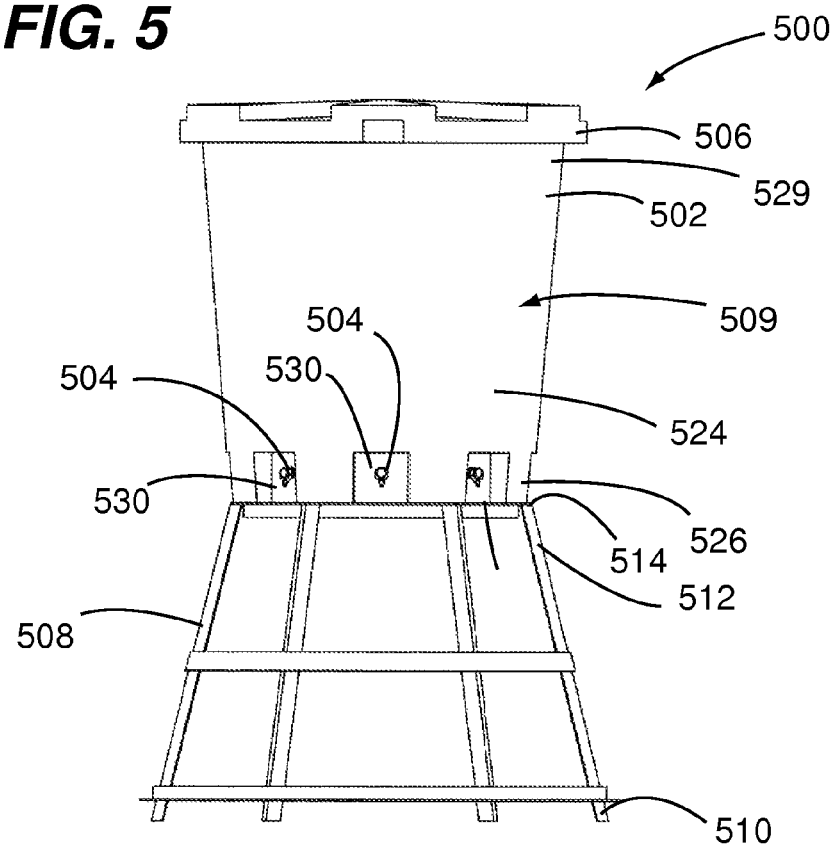
FIG. 5 is a side view of a liquid-dispensing station configured in accordance with a preferred stackable embodiment of the present invention.

Referring now to FIG. 5, a liquid-dispensing station 500 is shown. The liquid-dispensing station 500 includes a liquid-holding tank 502, a plurality of liquid-dispensing structures, 504, a tank cover 506, and a support stand 508. The support stand 508 has a lower portion 510 configured to be engaged with a station supporting surface (e.g., the ground, a floor, etc) and an upper portion 512 includes a tank-supporting surface 514 configured for having the liquid-holding tank 502 supported thereon.

Figure 6:
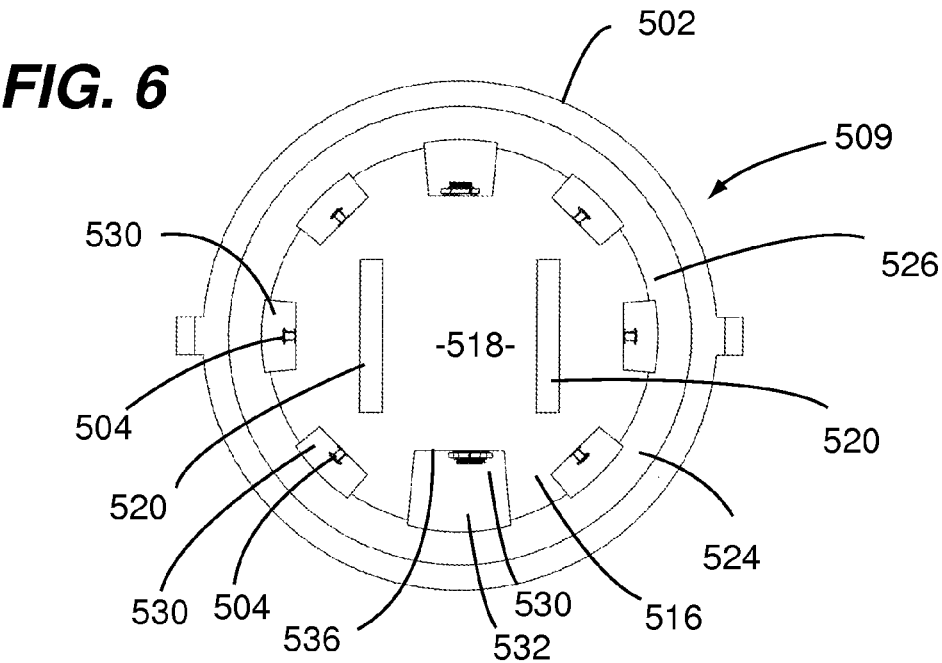
FIG. 6 is a bottom view of a liquid-dispensing apparatus of the liquid-dispensing station shown in FIG. 5.
Figure 7:
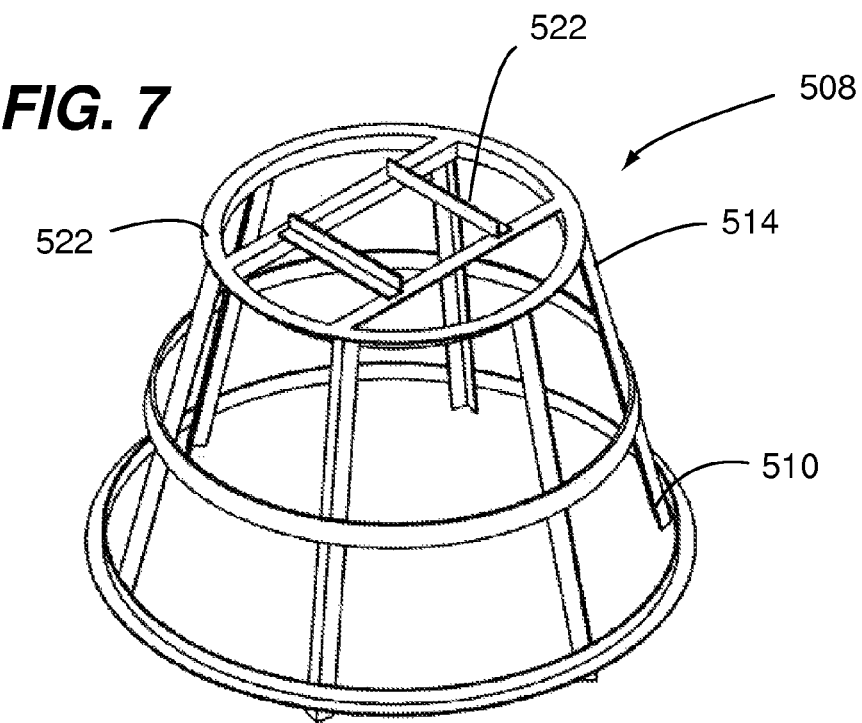
FIG. 7 is a perspective view of a support stand of the liquid-dispensing station shown in FIG. 5.

As shown in FIG. 6, a bottom wall 516 of the liquid-holding tank 502 defines a bottom surface 518 thereof and a plurality of stand positioning structures 520 are integral with the bottom wall 516 of the liquid-holding tank 502. As shown in FIG. 7, the upper portion 512 of the support stand 508 has a tank positioning structure 522 integral therewith. The bottom surface 518 of the liquid-holding tank 502 is seated on the tank-supporting surface 514 of the support stand 508 when the liquid-holding tank 502 is supported on the support stand 508, as shown in FIG. 5. The stand positioning structures 520 and the tank positioning structures 522 are engaged with each other for limiting unrestricted translation and/or rotation of the bottom surface 518 of the liquid-holding tank 502 along the tank-supporting surface 514 of the support stand 508 when the bottom surface 518 of the liquid-holding tank 502 is seated on the tank-supporting surface 514 of the support stand 508. It is disclosed herein that a single stand positioning structure and a single tank positioning structures can be implemented as opposed to a plurality of stand positioning structures and tank positioning structures. Furthermore, embodiments of the present invention are not unnecessarily limited to any particular shape of configuration of stand positioning structure and/or tank positioning structure.

As will be discussed below in greater deal, the liquid-holding tank 502 and the plurality of liquid-dispensing structures 504 jointly define a liquid-dispensing apparatus 509 that is specifically configured for being stacked in a manner whereby the liquid-dispensing apparatus 509 is stackable with a plurality of other identically-configured liquid-dispensing apparatuses without interference from the liquid-dispensing structures 504 thereof. In a preferred embodiment, the liquid-dispensing apparatus 509 being stackable with a plurality of other identically-configured liquid-dispensing apparatuses without interference from the liquid-dispensing structures thereof refers to the liquid-dispensing structures of one liquid-dispensing apparatus not contacting the liquid-holding tank of another identically configured liquid-dispensing apparatus when stacked therein.

Figure 8:
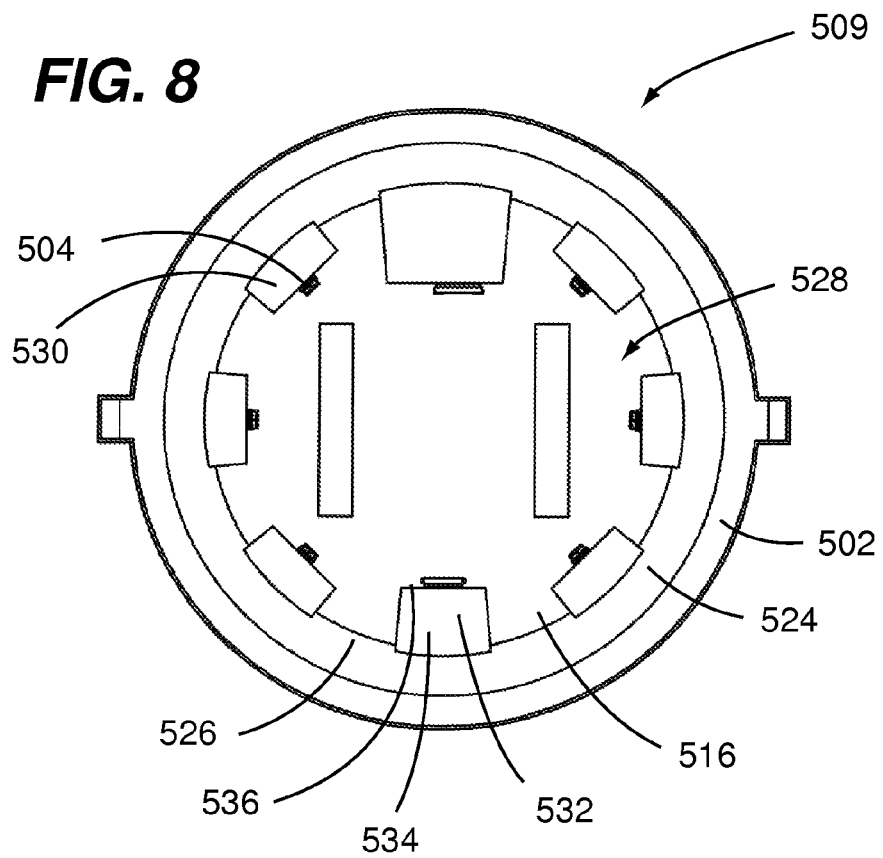
FIG. 8 is a top view of the liquid-dispensing apparatus shown in FIG. 5.

Referring now to FIGS. 5, 6, and 8, the liquid-holding tank 502 has a side wall 524 to which the bottom wall 516 is connected at a first end portion 526 of the side wall 524. In this manner, the side wall 525 and the bottom wall 516 jointly define a liquid-receiving space 528 of the liquid-holding tank 502. A closed end portion of the liquid-holding tank 502 is at the first end portion 526 of the side wall 524 and an open end portion of the liquid-holding tank 502 is at a second end portion 529 of the side wall 524. In the context of embodiments of the present invention, a side wall refers to a wall that surrounds the liquid-receiving space 528. As shown in FIGS. 5, 6, 8, 10, and 11 the side wall 524 is a generally round/cylindrical and tapered wall. However, a side wall of a liquid-dispensing apparatus in accordance with the present invention can be a non-round/non-cylindrical shape such as, for example rectangular (e.g., square-ish).

Figure 9:
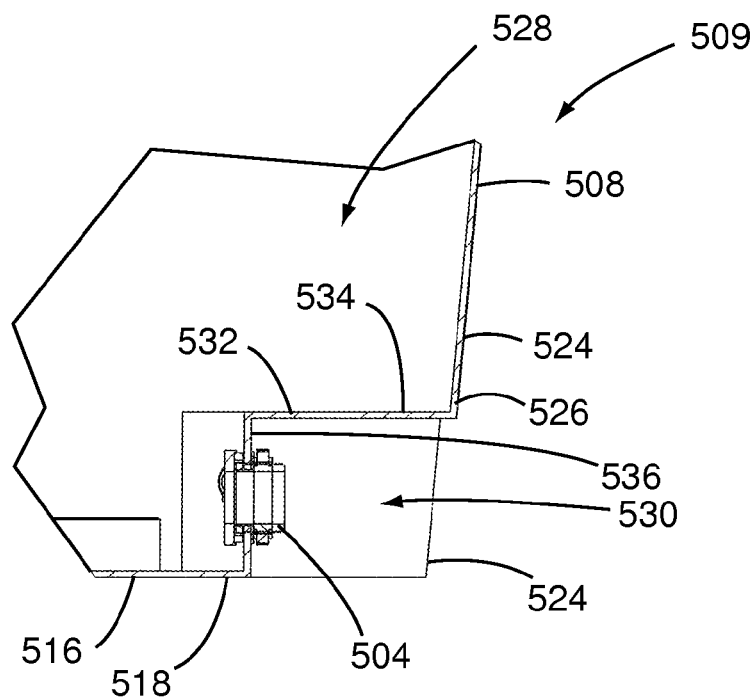
FIG. 9 is a fragmentary cross-sectional view of the liquid-dispensing apparatus shown in FIG. 5.

As shown in FIGS. 5, 6, and 9, the liquid-holding tank 502 includes a plurality of liquid-dispensing structure recesses 530 therein adjacent the bottom wall 516. It is disclosed herein that, in other embodiments, a liquid-holding tank in accordance with the present invention can have a single liquid-dispensing structure recess (e.g., that extends around an entire perimeter of the bottom wall). As shown in FIGS. 8 and 9, the top wall 532 of each one of the liquid-dispensing structure recesses 530 forms a landing 534 within the liquid-receiving space 528 of the liquid-holding tank 502. The liquid-dispensing structures 504 are each mounted on the liquid-holding tank 502 within a respective one of the liquid-dispensing structure recesses 530. Each one of the liquid-dispensing structures 504 is in fluid communication with the liquid-receiving space (e.g., a liquid flow passage of each the liquid-dispensing structures 504 is exposed to the liquid-receiving space 528 of the liquid-holding tank 502). Each one of the liquid-dispensing structures 504 is contained entirely within a space jointly defined between perimeter edges of the respective one of the liquid-dispensing structure recesses 530. More specifically, each one of the liquid-dispensing structures 504 is preferably constrained to not extending beyond a front edge 540 of the respective liquid-dispensing structure recess 530 or beyond the bottom surface 518 of the bottom wall 516.

Preferably, but not necessarily, the bottom wall 516 is substantially flat, the top wall 532 of each landing 534 is substantially flat and the bottom wall 516 and the top wall 532 extend substantially parallel to each other. Preferably, but not necessarily, each one of the liquid-dispensing structure recesses 530 intersects both the side wall 524 and the bottom wall 516. Each one of the liquid-dispensing structures 504 is preferably mounted directly on a wall of the liquid-holding tank 502 that defines the respective one of the liquid-dispensing structure recess 530 (e.g., a rear wall 536) in which a particular one of the liquid-dispensing structures 530 is mounted.

Figure 10:
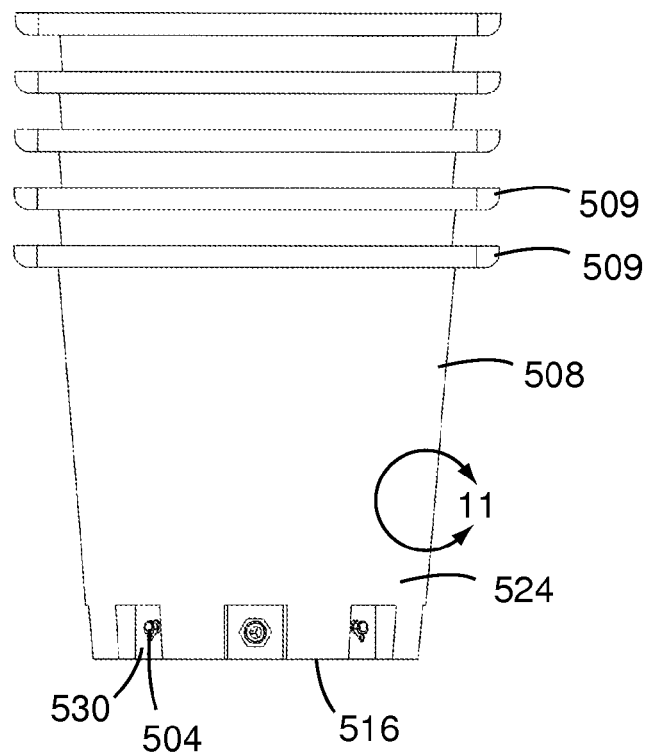
FIG. 10 is a side view showing a plurality of the liquid-dispensing apparatus shown in FIG. 5 in a stacked configuration.
Figure 11:
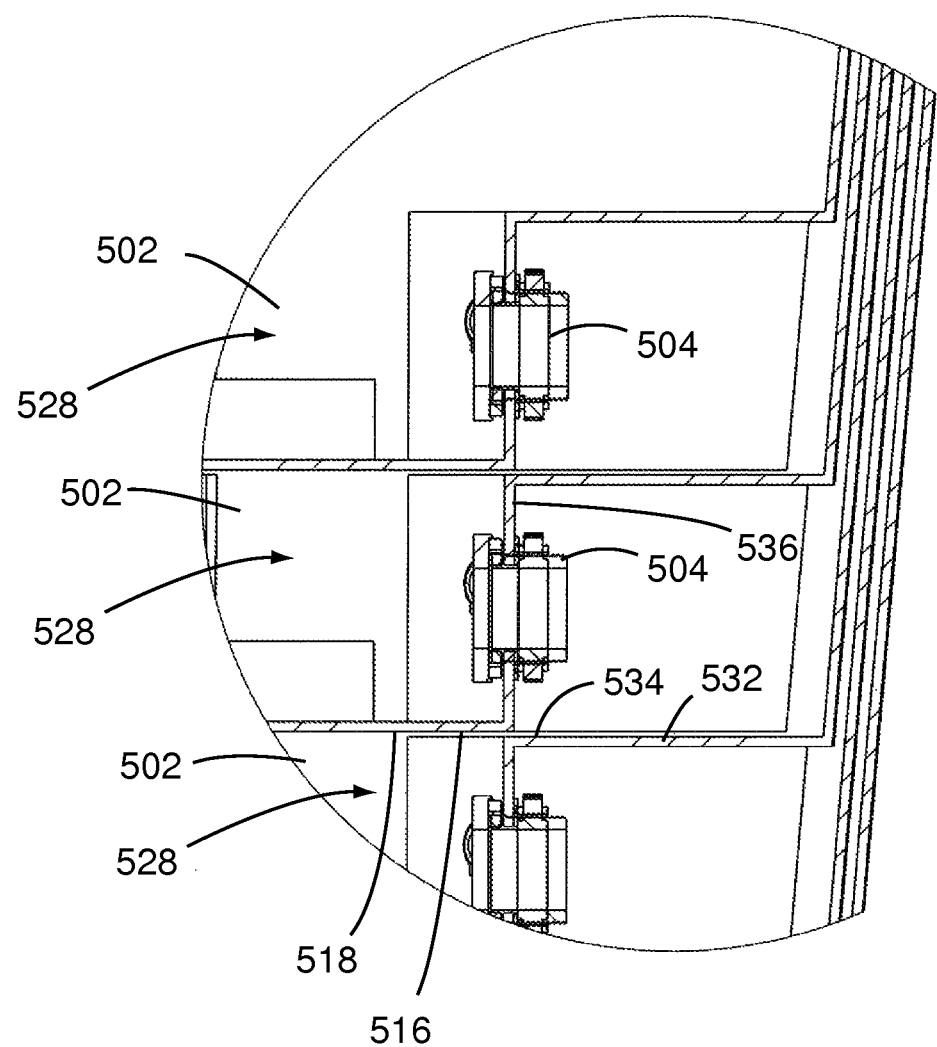
FIG. 11 is a fragmentary cross-sectional view of the liquid-dispensing apparatuses shown in FIG. 10 in the stacked configuration.

Referring now to FIGS. 10 and 11 in regard to stackability the liquid-dispensing apparatus 509 is an example of a stackable liquid-dispensing apparatus that is configured for enabling an identically-configured stackable liquid-dispensing apparatus to be positioned in the liquid-receiving space 528 thereof in a stacked manner. The bottom wall 516 of one of the liquid-dispensing apparatuses 509 rests upon the landing 534 of another one of the liquid-dispensing apparatuses 509 when the stacked together as shown in FIGS. 10 and 11. As shown, the liquid-dispensing structures 504 of one of the liquid-dispensing apparatuses 509 do not contact a mating stacked liquid-dispensing apparatus 509. To this end, the bottom surface 518 of one of the liquid-dispensing apparatuses 509 engages the top surface 534 of the landing 532 of the other one of the liquid-dispensing apparatuses 509 when stacked as shown in FIGS. 10 and 11, thus achieving a maximum insertion depth.

As shown in FIG. 11, a vertical distance between the top wall 532 of the liquid-dispensing structure recess 530 and the bottom wall 516 of the liquid-holding tank 502 contributes to defining the maximum insertion depth of the liquid-holding tank apparatus 509 with respect to an identically-configured liquid-holding tank apparatus when one is stacked within the stacked within the liquid-receiving space 528 of the other. Furthermore, a vertical taper of the side wall 524 of the liquid-holding tank 502 and the maximum insertion depth thereof are jointly configured to inhibit a full-perimeter interference fit between the side walls 524 of two liquid-holding tank apparatuses that are stacked together prior to the maximum insertion depth being attained. The full-perimeter interference fit refers to an exterior surface of the liquid-holding tank 502 of a first liquid-holding tank apparatus 509 being unrestrictedly wedging into contact with an exterior surface of the liquid-holding tank 502 of a second liquid-holding tank apparatus 509. By limiting the insertion depth of one liquid-holding tank apparatus 509 in the liquid-receiving space 528 of another liquid-holding apparatus 509, a clearance fit between the side walls 524 of the two liquid-holding apparatuses 509 can be maintained (i.e., based on as-designed, tool-surface dimensions that is).

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A stackable liquid-dispensing apparatus configured for enabling an identically-configured stackable liquid-dispensing apparatus to be positioned therein in a stacked manner and for enabling the stackable liquid-dispensing apparatus to be positioned within the identically-configured stackable liquid-dispensing apparatus in a stacked manner, the stackable liquid-dispensing apparatus comprising:

a liquid-holding tank having an open end portion, a closed end portion and a liquid-receiving space defined therebetween, wherein the liquid-holding tank includes a liquid-dispensing structure recess adjacent to the closed end portion thereof, wherein a landing within the liquid-receiving space defines a top wall of the liquid-dispensing structure recess, and wherein the liquid-holding tank rests upon the landing of the identically-configured stackable liquid-dispensing apparatus when the stackable liquid-dispensing apparatus is positioned in the stacked manner within the liquid-receiving space of the identically-configured stackable liquid-dispensing apparatus; and a liquid-dispensing structure mounted on the liquid-holding tank and in fluid communication with the liquid-receiving space thereof, wherein the liquid-dispensing structure is positioned entirely within the liquid-dispensing structure recess such that the liquid-dispensing structure does not contact the identically-configured stackable liquid-dispensing apparatus when the stackable liquid-dispensing apparatus is positioned in the stacked manner within the liquid-receiving space of the identically-configured stackable liquid-dispensing apparatus.

2. The stackable liquid-dispensing apparatus of claim 1 wherein the liquid-dispensing structure recess intersects a side wall of the liquid-holding tank.

3. The stackable liquid-dispensing apparatus of claim 2 wherein the liquid-dispensing structure recess intersects a bottom wall of the liquid-holding tank.

4. The stackable liquid-dispensing apparatus of claim 1 wherein:

the liquid-holding tank has a side wall and a bottom wall connected to the side wall such that the side wall and the bottom wall jointly define the liquid-receiving space thereof;

the bottom wall is substantially flat;

the bottom wall defines a bottom surface of the liquid-holding tank;

a top surface of the landing is substantially flat; and the bottom surface of the stackable liquid-dispensing apparatus engages the top surface of the landing of the identically-configured stackable liquid-dispensing apparatus when the stackable liquid-dispensing apparatus is positioned in the stacked manner within the liquid-receiving space of the identically-configured stackable liquid-dispensing apparatus.

5. The stackable liquid-dispensing apparatus of claim 4 wherein:

the liquid-dispensing structure recess intersects both the side wall and the bottom wall of the liquid-holding tank.

6. The stackable liquid-dispensing apparatus of claim 5 wherein:

the bottom wall and the top wall extend substantially parallel to each other;

a vertical distance between the top and bottom walls of the liquid-holding tank defines a maximum insertion depth of the liquid-holding tank apparatus with respect to the identically-configured liquid-holding tank apparatus when the liquid-holding tank apparatus is stacked within the liquid-receiving space of the identically-configured liquid-holding tank apparatus; and a vertical taper of the side wall of the liquid-holding tank and the maximum insertion depth thereof are jointly configured to inhibit a full-perimeter interference fit between the side wall of the liquid-holding tank apparatus and the side wall of the identically-configured liquid-holding tank apparatus when the liquid-holding tank apparatus is stacked within the liquid-receiving space of the identically-configured liquid-holding tank apparatus.

7. The stackable liquid-dispensing apparatus of claim 1 wherein the liquid-dispensing structure is mounted directly on a wall of the liquid-holding tank that defines the liquid-dispensing structure recess.

8. The stackable liquid-dispensing apparatus of claim 7 wherein:

the liquid-holding tank has a side wall and a bottom wall connected to the side wall such that the side wall and the bottom wall jointly define the liquid-receiving space thereof;

the bottom wall is substantially flat;

the bottom wall defines a bottom surface of the liquid-holding tank;

a top surface of the landing is substantially flat;

the bottom surface of the stackable liquid-dispensing apparatus engages the top surface of the landing of the identically-configured stackable liquid-dispensing apparatus when the stackable liquid-dispensing apparatus is positioned in the stacked manner within the liquid-receiving space of the identically-configured stackable liquid-dispensing apparatus;

the bottom surface and the top surface extend substantially parallel to each other; and the liquid-dispensing structure recess intersects both the side wall and the bottom wall.

9. A liquid-dispensing station, comprising:

a liquid-holding tank having a side wall and a bottom wall connected to the side wall at a first end portion of the side wall such that the side wall and the bottom wall jointly define a liquid-receiving space therein, wherein the liquid-holding tank includes a plurality of liquid-dispensing structure recesses therein adjacent the bottom wall thereof, wherein a top wall of each one of the liquid-dispensing structure recesses forms a landing within the liquid-receiving space of the liquid-holding tanks;

a plurality of liquid-dispensing structures each mounted on the liquid-holding tank within a respective one of the liquid-dispensing structure recesses, wherein each one of the liquid-dispensing structures is in fluid communication with the liquid-receiving space and wherein each one of the liquid-dispensing structures is contained entirely within a space jointly defined between perimeter edges of the respective one of the liquid-dispensing structure recesses; and a support stand having a lower portion configured to be engaged with a station supporting surface and an upper portion including a tank-supporting surface having the liquid-holding tank supported thereon, wherein the bottom wall of the liquid-holding tank defines a bottom surface thereof, wherein a stand positioning structure is integral with the bottom wall of the liquid-holding tank, wherein the upper portion of the support stand has a tank positioning structure integral therewith, wherein the bottom surface of the liquid-holding tank is seated on the tank-supporting surface of the support stand when the liquid-holding tank is supported on the support stand, and wherein the stand positioning structure and the tank positioning structure are engaged with each other for limiting unrestricted translation of the bottom surface of the liquid-holding tank along the tank-supporting surface of the support stand when the bottom surface of the liquid-holding tank is seated on the tank-supporting surface of the support stand.

10. The liquid-dispensing station of claim 9 wherein:

the bottom wall is substantially flat;

the top wall of each landing is substantially flat;

the bottom wall and the top wall extend substantially parallel to each other;

each one of the liquid-dispensing structure recesses intersects both the side wall and the bottom wall; and each one of the liquid-dispensing structures is mounted directly on a wall of the liquid-holding tank that defines the respective one of the liquid-dispensing structure recess in which a particular one of the liquid-dispensing structures is mounted.

11. The liquid-dispensing station of claim 9 wherein each one of the liquid-dispensing structures is mounted directly on a wall of the liquid-holding tank that defines the respective one of the liquid-dispensing structure recess in which a particular one of the liquid-dispensing structures is mounted.

12. The liquid-dispensing station of claim 9 wherein each one of the liquid-dispensing structure recesses intersects both the side wall and the bottom wall.

13. The liquid-dispensing station of claim 9 wherein:

the bottom wall is substantially flat;

the top wall of each landing is substantially flat; and the bottom wall and the top wall extend substantially parallel to each other.

14. The liquid-dispensing station of claim 13 wherein each one of the liquid-dispensing structure recesses intersects both the side wall and the bottom wall.

15. The liquid-dispensing station of claim 13 wherein each one of the liquid-dispensing structures is mounted directly on a wall of the liquid-holding tank that defines the respective one of the liquid-dispensing structure recess in which a particular one of the liquid-dispensing structures is mounted.

16. A liquid-dispensing station system, comprising:

a plurality of liquid-holding tank apparatuses each including a liquid-holding tank and a plurality of liquid-dispensing structures;

wherein each one of the liquid-dispensing structures is mounted on the liquid-holding tank and is in fluid communication with a liquid-receiving space thereof;

wherein the liquid-holding tank of each one of the liquid-holding tank apparatuses has a side wall and a bottom wall connected to the side wall at a first end portion of the side wall such that the side wall and the bottom wall jointly define the liquid-receiving space therein;

wherein each liquid-holding tank includes a plurality of liquid-dispensing structure recesses that are formed in the side wall thereof adjacent the bottom wall thereof;

wherein a top wall of each one of the liquid-dispensing structure recesses forms a landing within the liquid-receiving space of a respective one of the liquid-holding tanks;

wherein the side wall and bottom wall of a respective one of the liquid-holding tanks are jointly configured for enabling a first one of the liquid-holding tank apparatuses to be stacked within the liquid-receiving space of a second one of the liquid-holding tank apparatuses such that the bottom wall of the first one of the liquid-holding tank apparatuses is engaged with and supported by the landing of at least one of the liquid-dispensing structure recesses of the second one of the liquid-holding tank apparatuses when the first one of the liquid-holding tank apparatuses is stacked within the liquid-receiving space of the second one of the liquid-holding tank apparatuses; and wherein each one of the liquid-dispensing structures is positioned entirely within a respective one of the liquid-dispensing structure recesses such that no portion thereof contacts the side wall or the bottom wall of the second one of the liquid-holding tank apparatuses when the first one of the liquid-holding tank apparatuses is stacked within the liquid-receiving space of the second one of the liquid-holding tank apparatuses.

17. The liquid-dispensing station system of claim 16, further comprising:

a plurality of support stands each having a lower portion configured to be engaged with a station supporting surface and an upper portion including a tank-supporting surface configured for having a respective one of the liquid-holding tank apparatuses supported thereon;

wherein the bottom wall of each one of the liquid-holding tanks defines a bottom surface thereof;

wherein each one of the liquid-holding tanks has a stand positioning structure integral with the bottom wall thereof;

wherein the upper portion of each one of the support stands has a tank positioning structure integral therewith;

wherein the stand positioning structure and the tank positioning structure are jointly configured to engage each other for limiting unrestricted translation of the bottom surface of a particular one of the liquid-holding tank along the tank-supporting surface of the support stand of a particular one of the support stands when the bottom surface of the particular one of the liquid-holding tank apparatuses is seated on the tank-supporting surface of the particular support stands.

18. The liquid-dispensing station system of claim 17 wherein each one of the liquid-dispensing structures is mounted directly on a wall of the liquid-holding tank of a respective one of the liquid-holding tank apparatuses that defines the respective one of the liquid-dispensing structure recesses in which a particular one of the liquid-dispensing structures is mounted.

19. The liquid-dispensing station system of claim 18 wherein each one of the liquid-dispensing structure recesses of the liquid-holding tanks of a particular one of the liquid-holding tank apparatuses intersects both the side wall and the bottom wall thereof.

20. The liquid-dispensing station system of claim 16 wherein:

the bottom wall is substantially flat;

the bottom wall defines a bottom surface of the liquid-holding tank;

the top wall of each landing is substantially flat;

the bottom wall and the top wall extend substantially parallel to each other;

a vertical distance between the top and bottom walls defines a maximum insertion depth of the first one of the liquid-holding tank apparatuses with respect to the second one of the liquid-holding tank apparatuses when the first one of the liquid-holding tank apparatuses is stacked within the liquid-receiving space of the second one of the liquid-holding tank apparatuses; and a vertical taper of the side wall of the liquid-holding tank of each one of the liquid-holding tank apparatuses and the maximum insertion depth thereof are jointly configured to inhibit a full-perimeter interference fit between the side wall of the first one of the liquid-holding tank apparatuses and the side wall of the second one of the liquid-holding tank apparatuses when the first one of the liquid-holding tank apparatuses is stacked within the liquid-receiving space of the second one of the liquid-holding tank apparatuses.

* * * * *